United States Patent
Rostaing et al.

(10) Patent No.: US 8,084,727 B2
(45) Date of Patent: Dec. 27, 2011

(54) DEVICE FOR DETECTING AN ELECTROMAGNETIC RADIATION WITH CURRENT LIMITATION

(75) Inventors: Jean-Pierre Rostaing, La Cote Saint Andre (FR); Fabrice Guellec, Saint Paul de Varces (FR); Michaël Tchagaspanian, Saint Ismier (FR)

(73) Assignee: Commissariat a l'Energie Atomique, Paris (FR)

( * ) Notice: Subject to any disclaimer, the term of this patent is extended or adjusted under 35 U.S.C. 154(b) by 474 days.

(21) Appl. No.: 12/194,069

(22) Filed: Aug. 19, 2008

(65) Prior Publication Data

US 2009/0072121 A1    Mar. 19, 2009

(30) Foreign Application Priority Data

Sep. 14, 2007    (FR) ...................................... 07 57589

(51) Int. Cl.
    *H01L 27/00*    (2006.01)
(52) U.S. Cl. ............... 250/208.1; 250/208.2; 250/214.1; 250/214 A; 257/230; 348/299; 348/314; 438/79
(58) Field of Classification Search ............... 250/208.1, 250/214.1, 214 A, 208.2
    See application file for complete search history.

(56) References Cited

U.S. PATENT DOCUMENTS

| | | | | |
|---|---|---|---|---|
| 5,303,027 A | * | 4/1994 | Kuderer et al. | 356/328 |
| 6,194,703 B1 | * | 2/2001 | Kuderer | 250/214 R |
| 6,300,615 B1 | * | 10/2001 | Shinohara et al. | 250/214 R |
| 6,504,141 B1 | * | 1/2003 | Kozlowski et al. | 250/214 A |
| 6,847,025 B1 | * | 1/2005 | Idesawa et al. | 250/208.1 |
| 2002/0030151 A1 | * | 3/2002 | Blaszczynski | 250/208.1 |
| 2003/0071232 A1 | | 4/2003 | Alexandrovich et al. | |

FOREIGN PATENT DOCUMENTS

FR    2857545    1/2005

OTHER PUBLICATIONS

Republique Francaise Institut National, French Search Report dated May 5, 2008 (2 pgs.)

* cited by examiner

*Primary Examiner* — Georgia Y Epps
*Assistant Examiner* — Kevin Wyatt

(57) ABSTRACT

This device for detecting an electromagnetic radiation, comprises a matrix of juxtaposed elementary sensors (1), each associated with a common substrate in which a sequential addressing read circuit is prepared, specific to each of the sensors, thereby constituting as many pixels, the interaction of the radiation with the sensors generating electric charges to be converted to voltage for their subsequent processing, each of the said sensors being biased via an injection transistor (2), of which one of the terminals is connected to an integration capacitance (3), storing the electric charges generated by the sensor during an integration phase, and whereof the quantity of charges is then processed for conversion to voltage. Each of the pixels of the said matrix is associated with a current limiting device (5), for limiting the current generated by each of the elementary sensors to a maximum called reference current, regardless of the radiation flux received by the pixel concerned.

4 Claims, 4 Drawing Sheets

DEVICE FOR DETECTING AN ELECTROMAGNETIC RADIATION WITH CURRENT LIMITATION

CROSS REFERENCE TO RELATED APPLICATIONS

This application claims priority under 35 U. S. C. §119 from French Patent Application No. 0757589 filed on Sep. 14, 2007 in the French Patent Office, the entire disclosure of which is incorporated herein by reference.

FIELD OF THE INVENTION

The invention relates to a device for detecting an electromagnetic radiation, more particularly for detecting infrared radiation, ultraviolet radiation, X-rays, and in the visible region.

This device uses sensors sensitive to such radiations, and for the infrared region, uses quantum detectors, that are operating at very low temperature (close to liquid nitrogen) as opposed to ambient temperature infrared detectors, which use bolometers.

BACKGROUND OF THE INVENTION

In the field of electromagnetic radiation detection, it is well known how to use devices arranged in matrix form, that is comprising a plurality of juxtaposed elementary sensors in order to form a matrix having a number of lines and columns. The interactions of the electromagnetic radiations with these elementary sensors, also called "pixels," generate flows of charge carriers, of which the energy and/or quantity corresponds to the energy of the incident radiation. Typically, the charge carriers consist of electrons or conduction gaps.

The charge carrier flux flows towards the read circuit associated with the sensor to form analog signals. These signals are then processed for subsequent reconstruction of a visible image, a function of the incident lighting.

An imager is thus produced, consisting of a matrix of pixels sensitive to a predefined range of electromagnetic radiations.

FIG. 1 shows the read circuit associated with an elementary detector in the infrared region, the said detector typically consisting of a photodiode, and using a MOSFET injection transistor.

In the present case, the photodiode dph 1 is subjected to a bias voltage via a voltage applied to the grid G of an injection transistor Minj 2, in the present case consisting of an N type MOSFET, connected to the photodiode dph 1 via its source S. The drain D of the injection transistor 2 is connected to an integration capacitance Cint 3.

When the photodiode 1 is subjected to a radiation with an energy hυ and flux Φ, the said radiation causes the photodiode to generate a current $i(\Phi)$ which passes through the injection transistor 2 by matching is voltage VGS, and also the integration capacitance Cint 3.

During the integration time T, the current $i(\Phi)$ charges the capacitance Cint with charge carriers according to the equation $$Q_{int}(\Phi, T) = \int_0^T i(\Phi), dt.$$

A switch 4 serves to transfer the charge $Q_{int}((\Phi,T)$ from the capacitance 3, for example to an amplifier for converting this charge to voltage, in a manner known per se.

It is obviously possible to use a P type MOSFET injection transistor, or even junction gate field effect transistors (JFET), and even bipolar transistors. These various transistors may be N or P doped, and may even be enriched or depleted.

If the incident photon flux is too intense, the current generated in the elementary detector rapidly becomes too high, and a depolarization of all the detectors of the matrix is observed. In such a situation, the matrix is then bloomed and the reconstruction of the visible image is compromised, or even impossible. In other words, the whole image becomes black even though a single, or even a few of the component pixels are affected by this blooming.

In order to overcome this malfunction, anti-blooming devices have been proposed, based on a clamping of the surplus current, but which does not prevent the saturation of the detector itself.

It is the object of the present invention to propose a detection device of the type in question, which overcomes these blooming problems, but without acting on the actual detector, but more on the electronic circuitry associated with the said detector, and therefore more particularly on the read circuit.

SUMMARY OF THE INVENTION

The invention relates to a device for detecting an electromagnetic radiation, comprising a matrix of juxtaposed elementary sensors, each associated with a common substrate in which a sequential addressing read circuit is prepared, specific to each of the sensors, the interaction of the radiation with the sensors generating electric charges to be converted to voltage for their subsequent processing, each of the said sensors being biased via an injection transistor, of which one of the terminals is connected to an integration capacitance, storing the electric charges generated by the sensor during an integration phase, and whereof the quantity of charges is then processed for conversion to voltage.

According to one feature of the invention, each of the pixels of the said matrix, consisting of an elementary sensor and its specific read circuit, is associated with a current limiting device, for limiting the current generated by each of the elementary sensors to a maximum called reference current, regardless of the radiation flux received by the pixel concerned.

In other words, the invention consists not in acting on the elementary sensors, but directly on the associated read circuit, in such a way as to cause, in the sensor concerned, a variation in the bias voltage, suitable, if necessary, for decreasing the sensitivity of the detector to an excessively high flux of detected radiation.

According to the invention, the current limiting device receives two input signals, the measurement of the detector current and the reference current respectively, and in that it transmits an output signal, consisting of a physical quantity suitable for controlling the injection transistor.

According to the invention, this current limiting device comprises at least: a current comparator, for comparing the current of the sensor charging the integration capacitance with the reference value, and a circuit for modifying the grid voltage of the injection transistor according to the comparison thus made.

According to the invention, the current limiting device is mounted in feedback with regard to the bias circuit of the elementary sensor. Due to its feedback arrangement, the system balances itself alone without external action. In fact, due to this feedback, a servocontrolled and stable system is obtained: an increase in the output signal causes a decrease in the input stimulus. The reference current is matchable by a current source $i_{ref}$, acting on the comparator. The value of this current is selected according to the value of the flux to be detected, the sensitivity, and the type of detector.

Advantageously, the sensor current is duplicated by means of a current mirror, connected to the input of the current comparator, the other input of the said comparator receiving the reference current $i_{ref}$, the said comparator making a summation between the duplicated current and the reference current, of which the resulting current is in turn amplified and converted to bias voltage via the injection transistor.

BRIEF DESCRIPTION OF THE FIGURES

The manner in which the invention can be implemented and the advantages thereof will appear more clearly from the exemplary embodiment that follows, given for information and non-limiting, in conjunction with the appended figures.

DETAILED DESCRIPTION OF THE INVENTION

Figure 2:
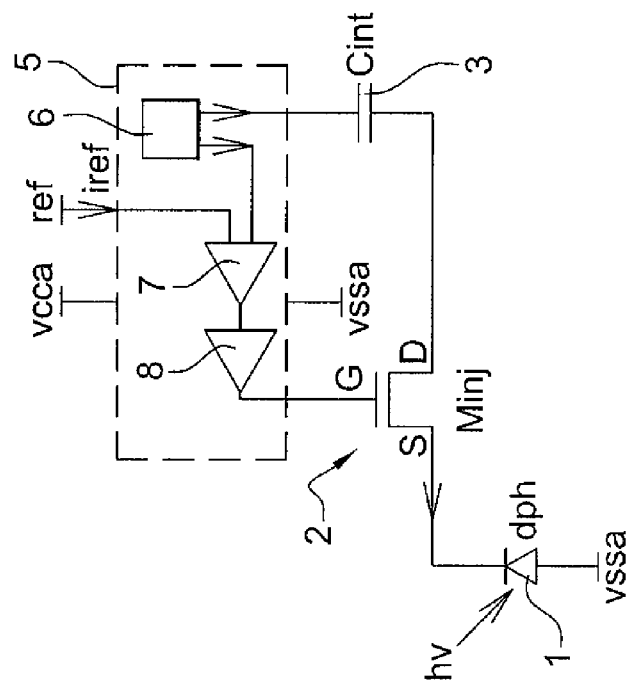
FIG. 2 is a schematic representation illustrating the operating principle of the current limiter according to the invention.

FIG. 2 illustrates the general principle of the detection device according to the invention.

The rest of the description is more concerned with describing an infrared detector using photodiodes. However, it is obvious that a person skilled in the art is capable of modifying the components required to adapt the said components to the type of radiation to be detected, in particular X-rays, visible region, ultraviolet region.

Figure 1:
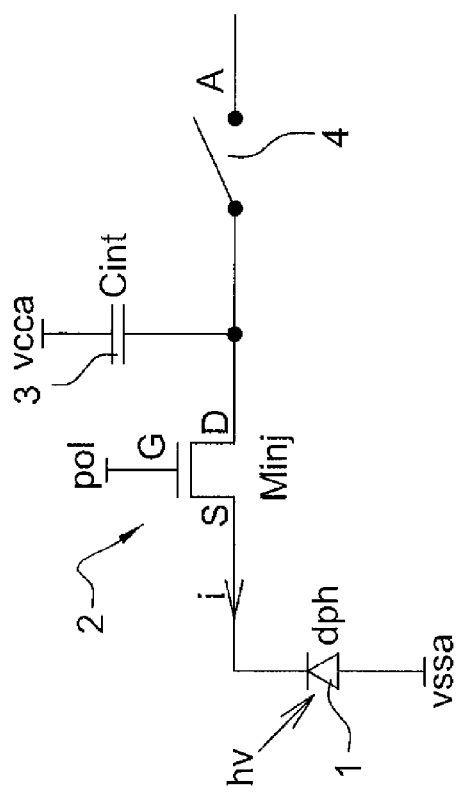
FIG. 1, as already stated, is a schematic representation of the read circuit of an elementary sensor of a detector according to the prior art.

In the present case, a photodiode 1 is used of the same type and same characteristics as the one described in conjunction with FIG. 1.

As may be observed, the current limiter 5 according to the invention is mounted in feedback on the grid G of the injector transistor 2. For this purpose, it first comprises a current mirror 6 consisting (cf. FIG. 4) of a transistor M1 and a transistor M2 for which current ratios equal to 1 are selected, but in a non-limiting manner.

The current mirrors are well known to a person skilled in the art, so that there is no need to describe them in greater detail here. It should simply be recalled that such a current mirror is a particular circuit, in the present case designed with two transistors, for reflecting (duplicating) the initial current, in the present case issuing from the integration capacitance 3, into an output current, in the present case equal, or in any case proportional to the incident current, independently of the load connected to the output current, and in the present case to the comparator 7 described below in greater detail.

In other words, the current in the transistor M2 is the image of the current i(Cint), so that:

$$ids(M2)=ids(M1)=i(Cint).$$

Figure 3:
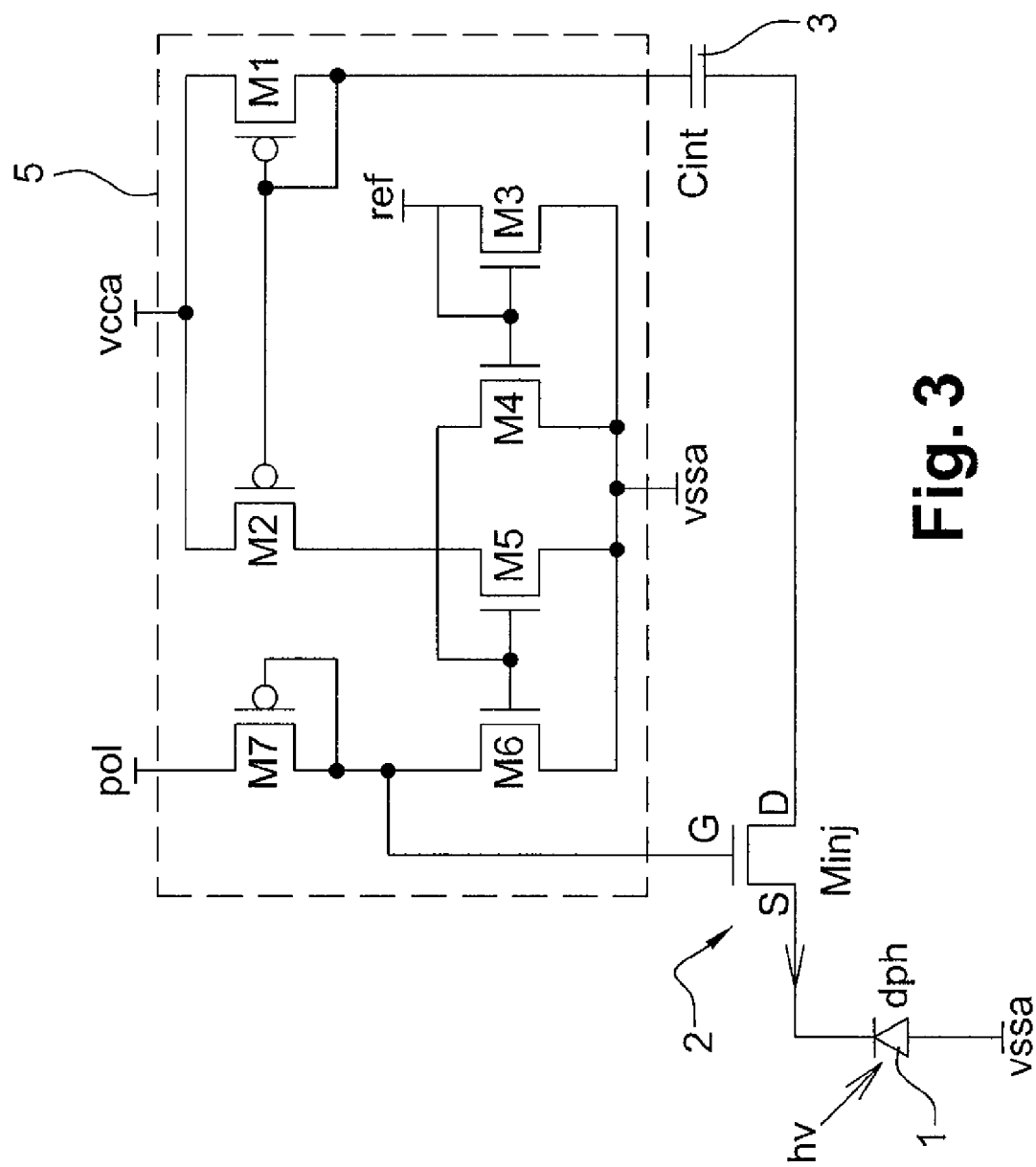
FIG. 3 is a schematic representation illustrating one possible embodiment of the current limiter of the invention, implementing the CMOS microelectronic technology.

According to the invention, a reference current $i_{ref}$ is injected by means of a current source (not shown) and to do this, a current mirror is also used, consisting of two transistors M3 and M4 as may be observed in FIG. 3. Thus, the current in the transistor M4 is the image of the transistor M3 with which it forms the current mirror.

Obviously, for a simpler device, such a current mirror is not indispensable. Thus, the reference current may be applied directly to the drain of the transistor M5, described below.

Advantageously, the transistor M3 may be common to several pixels and therefore placed outside the pixel concerned, as a shared resource.

The current comparator 7 consists in the present case of the transistor M5 (FIG. 3) which summates the input current ids(M2) corresponding, as already stated, to the current issuing from the integration capacitance 3, and the output current ids(M4) corresponding to the reference current, giving the equation:

$$ids(M5)=ids(M2)-ids(M4)=ids(Cint)-iref$$

In doing so, if the current issuing from the transistor M2 is higher than the current issuing from the transistor M4, that is if the current issuing from the integration capacitance 3 is higher than the current setpoint or reference current $i_{ref}$, then the current in M5 is positive. In the opposite case, the current in M5 is zero, the reference current $i_{ref}$ thus constituting a threshold.

A new current mirror, consisting in the present case of transistors M5 and M6, duplicates the current resulting from the transistor M5.

An amplifier consisting of the transistor M7, of which the source is connected to the bias voltage, is traversed by the current issuing from the current mirror M6 M5 and generates a voltage applied to the grid G of the injection transistor 2 according to the equation:

$$V(G)=V(pol)-(1/GM7)\cdot ids(M7)=V(pol)-(R7)\cdot ids(M7).$$

Finally, $$V(G)=V(pol)-(R7)\cdot(ids(Cint)-iref)).$$

In doing so, if the current issuing from the integration capacitance 3 exceeds the value of the threshold current iref, then it is limited to this value. If, on the other hand, this current is lower than the threshold current, no modification of the bias voltage occurs at the grid G of the injection transistor 2.

It may be observed that when the integration capacitance is filled or saturated, the drain potential of the injection transistor 2 descends to Vds=0. The transistor is then in blocked mode and prevents the current from passing through: the integration capacitance 3 no longer accepts any charge.

In a particular exemplary embodiment, the dimensions of the various MOSFET transistors of the current limiting device for a 0.5 µm technology may be expressed for example in µm:

Minj=3/1; M1 to M6: 1/1; M7: 1/5
W/L=3/1 for Minj
W/L=1/1 for M4 to M6
W/L=1/5 for M7

The above assembly produces a feedback effect on the grid G of the injection transistor 2. In doing so, two states are accordingly possible: below the value of the reference current, the feedback is inactive: the read circuit then respects the integrity of the current produced by the photon flux; above the reference current value, a current variation in the integration capacitance causes a potential variation on the grid of the injection transistor 2, this variation in turn causing a similar variation in the bias voltage of the detector, which tends to decrease the detector current and the permissible current to the value of the reference current.

FIGS. 4a, 4b, 4c, and 4d show the translation of the action of the current limiter according to the invention in the form of curves.

Figure 4A:
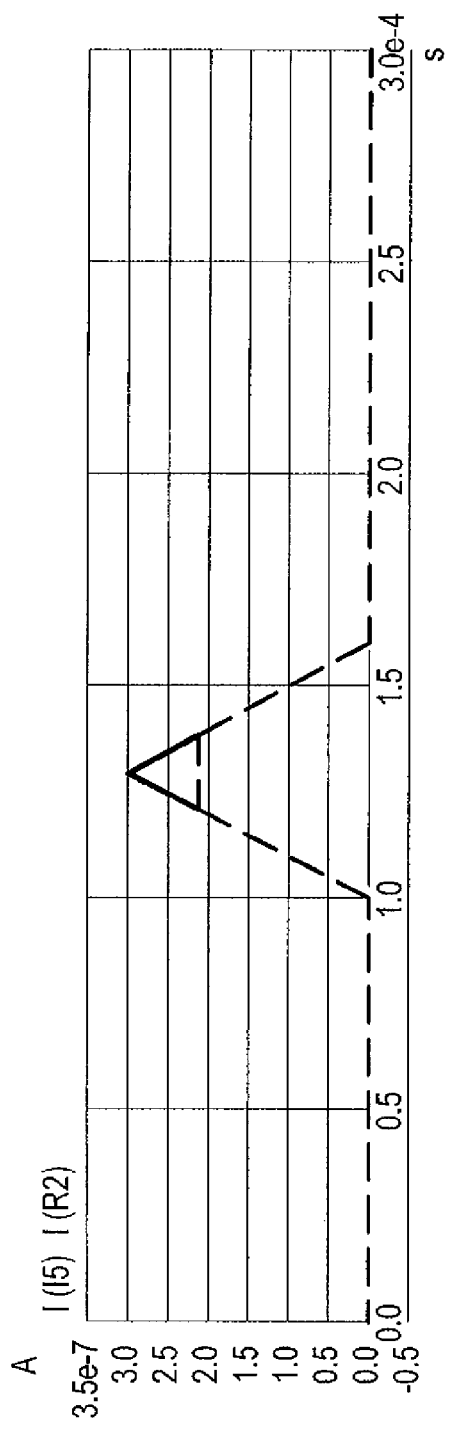
FIGS. 4a, 4b, 4c, and 4d show a set of graphs illustrating the variation in current and voltage at the terminals of some of the components of an elementary sensor or of its associated read circuit, highlighting the action of the current limiter according to the invention.

Thus FIG. 4a shows the variation in current resulting from the photon flux at the input of the circuit, that is the current resulting from the charge carriers generated by the photodiode.

More precisely, such a variation is shown with a reference photodiode, not connected to the read circuit, and the same variation with a photodiode associated with the read circuit according to the invention.

It may thus be observed that for a threshold current fixed at 200 nA, the respective curves are superimposed between the reference current of the photon flux and the current passing through the photodiode. Above this current, on the other hand, there is a limitation of the current generated by the photodiode to this value (broken lines).

Figure 4B:
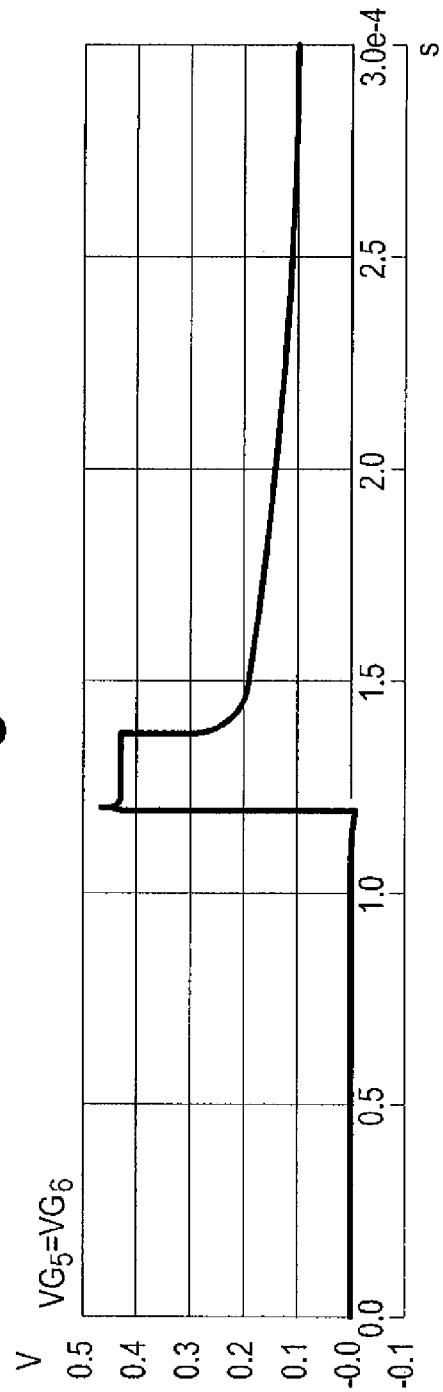

FIG. 4b shows the variation in the grid voltage of the transistor M6. It may be observed that when the reference current is reached, this voltage suddenly increases because the duplicated current has just exceeded the reference current.

Figure 4C:
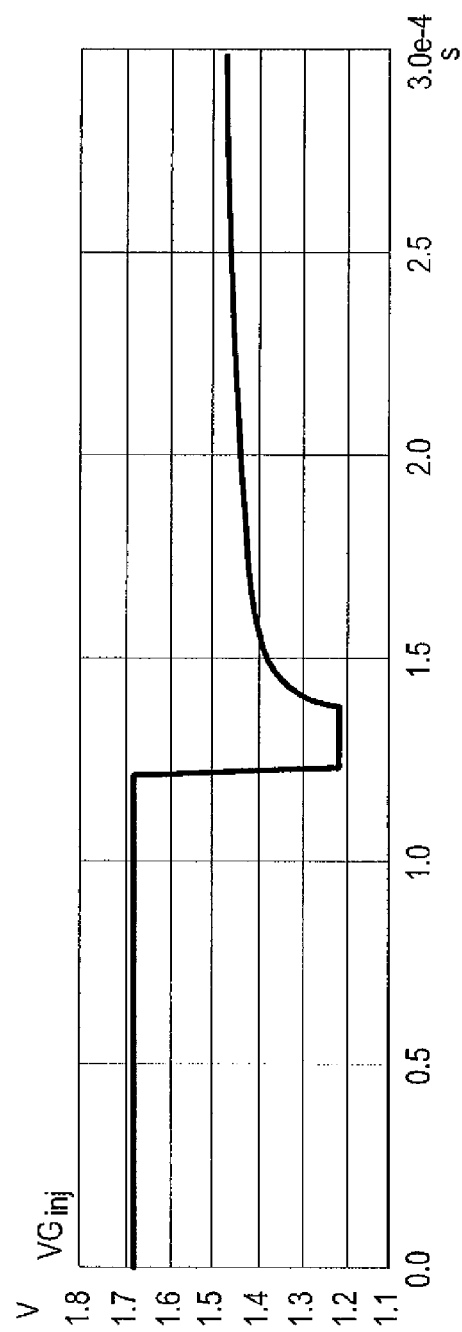

FIG. 4c shows the variation in the grid voltage of the injection transistor. It may thus be observed that when the threshold current is exceeded, the bias voltage is decreased in order to reduce the bias of the photodiode concerned.

Figure 4D:
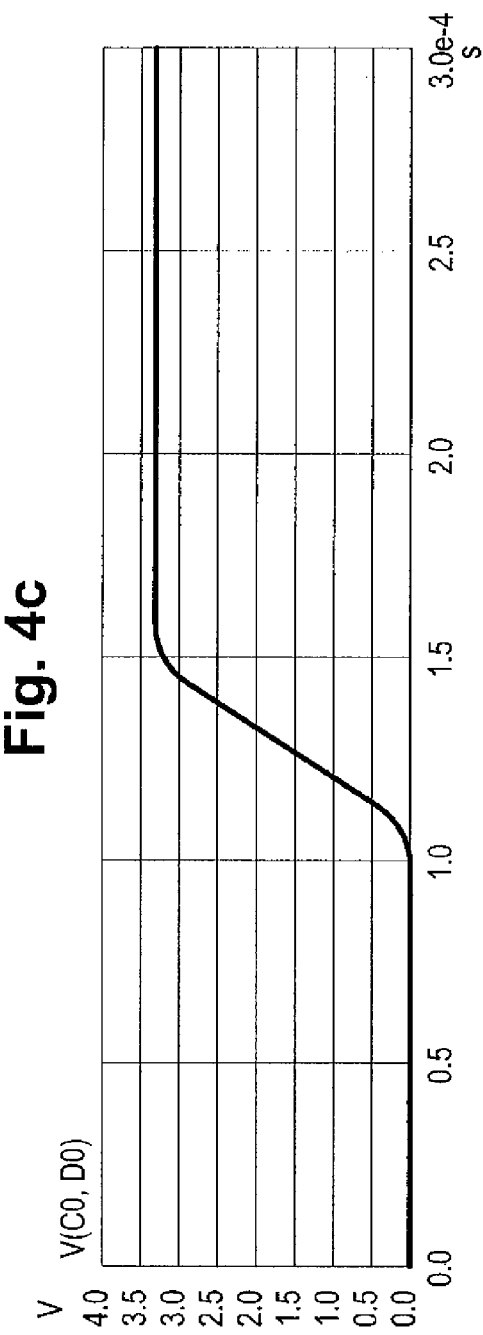

FIG. 4d shows the variation in voltage at the terminals of the integration capacitance 3. It may be observed that the voltage is measured even when the threshold is reached. There is no interruption of the operation of the pixel.

The invention has various advantages.

Firstly, it may be observed that with this device, the problem of depolarization of detectors is overcome by using an electronic solution, in the absence of any direct action on the elementary sensors. This overcomes the problems of blooming, such as for example the attack of an infrared detector by a laser signal, which is particularly focused by definition.

Also important is the fact that even with the presence of the device of the invention, the measurement of the detector below the threshold is not degraded.

Furthermore, the only data lost relates to the pixel concerned having undergone the blooming, and not the entire matrix.

We claim:

1. The device for detecting an electromagnetic radiation, comprising a matrix of juxtaposed elementary sensors, each associated with a common substrate in which a sequential addressing read circuit is prepared, specific to each of the sensors, thereby constituting as many pixels, the interaction of the radiation with each of the sensors generating electric charges outputted by the sensor in the form of a current to be converted to voltage for their subsequent processing, each of the sensors being biased via an injection transistor, of which one of the terminals is connected to an integration capacitance, integrating the electric charges generated by the sensor during an integration phase, the quantity of charges stored during the integration phase being the integration capacitance, which is then processed for conversion to voltage, wherein each of the pixels of the matrix is associated with a current limiting device, for limiting the current outputted by each of the elementary sensors to a maximum called reference current, regardless of the radiation flux received by the pixel concerned, wherein the current limiting device receives two input signals, the measurement of the detector current and the reference current respectively, and in that it transmits an output signal, consisting of a physical quantity suitable for controlling the injection transistor.

2. The device for detecting an electromagnetic radiation, comprising a matrix of juxtaposed elementary sensors, each associated with a common substrate in which a sequential addressing read circuit is prepared, specific to each of the sensors, thereby constituting as many pixels, the interaction of the radiation with each of the sensors generating electric charges outputted by the sensor in the form of a current to be converted to voltage for their subsequent processing, each of the sensors being biased via an injection transistor, of which one of the terminals is connected to an integration capacitance, integrating the electric charges generated by the sensor during an integration phase, the quantity of charges stored during the integration phase being the integration capacitance, which is then processed for conversion to voltage, wherein each of the pixels of the matrix is associated with a current limiting device, for limiting the current outputted by each of the elementary sensors to a maximum called reference current, regardless of the radiation flux received by the pixel concerned, wherein the current limiting device is mounted in feedback with regard to the bias circuit of the elementary sensor.

3. The device for detecting an electromagnetic radiation, comprising a matrix of juxtaposed elementary sensors, each associated with a common substrate in which a sequential addressing read circuit is prepared, specific to each of the sensors, thereby constituting as many pixels, the interaction of the radiation with each of the sensors generating electric charges outputted by the sensor in the form of a current to be converted to voltage for their subsequent processing, each of the sensors being biased via an injection transistor, of which one of the terminals is connected to an integration capacitance, integrating the electric charges generated by the sensor during an integration phase, the quantity of charges stored during the integration phase being the integration capacitance, which is then processed for conversion to voltage, wherein each of the pixels of the matrix is associated with a current limiting device, for limiting the current outputted by each of the elementary sensors to a maximum called reference current, regardless of the radiation flux received by the pixel concerned, wherein the current limiting device comprises at least:
   a current comparator, for comparing the current of the sensor charging the integration capacitance with the reference value; and
   a circuit for modifying the grid voltage of the injection transistor according to the comparison thus made.

4. The device for detecting an electromagnetic radiation according to claim 3, wherein the sensor current is duplicated by means of a current mirror, connected to the input of the current comparator, the other input of the said comparator receiving the reference current $i_{ref}$, the said comparator making a summation between the duplicated current and the reference current, of which the result is in turn amplified and converted to bias voltage via the injection transistor.

* * * * *